(12) United States Patent
Wang et al.

(10) Patent No.: US 11,848,819 B2
(45) Date of Patent: *Dec. 19, 2023

(54) SYNCHRONIZATION OF A SHARED SERVICE CONFIGURATION ACROSS COMPUTATIONAL INSTANCES

(71) Applicant: ServiceNow, Inc., Santa Clara, CA (US)

(72) Inventors: Peng Wang, Kirkland, WA (US); Shoujing Li, Bellevue, WA (US)

(73) Assignee: SERVICENOW, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,100

(22) Filed: Mar. 10, 2023

(65) Prior Publication Data

US 2023/0208713 A1    Jun. 29, 2023

Related U.S. Application Data

(63) Continuation of application No. 16/930,931, filed on Jul. 16, 2020, now Pat. No. 11,632,300.

(51) Int. Cl.
*H04L 67/1095* (2022.01)
*H04L 41/0813* (2022.01)
(Continued)

(52) U.S. Cl.
CPC ........... *H04L 41/084* (2013.01); *G06N 20/00* (2019.01); *H04L 41/0813* (2013.01); *H04L 67/1095* (2013.01)

(58) Field of Classification Search
CPC ............... H04L 41/084; H04L 41/0813; H04L 67/1095; G06N 20/00
See application file for complete search history.

(56) References Cited

U.S. PATENT DOCUMENTS 4,941,084 A   7/1990   Terada
5,185,860 A   2/1993   Wu
(Continued)

FOREIGN PATENT DOCUMENTS

EP   0433979 A2   6/1991
EP   1607824 A2   12/2005
(Continued)

OTHER PUBLICATIONS

International Search Report and Written Opinion dated Oct. 26, 2021 for International Application No. PCTUS2021/041264, 11 pages.
(Continued)

*Primary Examiner* — Chris Parry
*Assistant Examiner* — Steven C Nguyen
(74) *Attorney, Agent, or Firm* — McDonnell Boehnen Hulbert & Berghoff LLP

(57) ABSTRACT

An embodiment may involve: transmitting, by a non-production computational instance and to a central computational system, a configuration for a service provided by the central computational system, wherein the non-production computational instance is arranged to test the configuration; appending, to the configuration at the non-production computational instance, a synchronization identifier to indicate that the configuration has been synchronized with the central computational system; receiving, by a production computational instance and from the non-production computational instance, a copy of the configuration; reading, by the production computational instance, the synchronization identifier from the copy of the configuration; determining that the synchronization identifier is not reflected as part of a synchronization history maintained at the production computational instance; and, in response to determining that the synchronization identifier is not reflected in the synchroni- (Continued)

zation history, transmitting, by the production computational instance, the copy of the configuration to the central computational system.

20 Claims, 11 Drawing Sheets

(51) Int. Cl.
  *H04L 41/084* (2022.01)
  *G06N 20/00* (2019.01)

(56) References Cited

U.S. PATENT DOCUMENTS

| | | | |
|---|---|---|---|
| 5,237,518 A | 8/1993 | Sztipanovits | |
| 5,261,097 A | 11/1993 | Saxon | |
| 5,265,252 A | 11/1993 | Rawson, III | |
| 5,367,685 A | 11/1994 | Gosling | |
| 5,390,297 A | 2/1995 | Barber | |
| 5,442,791 A | 8/1995 | Wrabetz | |
| 5,452,415 A | 9/1995 | Hotka | |
| 5,522,042 A | 5/1996 | Fee | |
| 5,533,116 A | 7/1996 | Vesterinen | |
| 5,655,081 A | 8/1997 | Bonnell | |
| 5,659,736 A | 8/1997 | Hasegawa | |
| 5,671,412 A | 9/1997 | Christiano | |
| 5,696,701 A | 12/1997 | Burgess | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke | |
| 5,887,139 A | 3/1999 | Madison, Jr. | |
| 5,909,217 A | 6/1999 | Bereiter | |
| 5,937,165 A | 8/1999 | Schwaller | |
| 5,949,976 A | 9/1999 | Chappelle | |
| 5,978,594 A | 11/1999 | Bonnell | |
| 6,021,437 A | 2/2000 | Chen | |
| 6,041,347 A | 3/2000 | Harsham | |
| 6,088,717 A | 7/2000 | Reed | |
| 6,101,500 A | 8/2000 | Lau | |
| 6,128,016 A | 10/2000 | Coelho | |
| 6,131,118 A | 10/2000 | Stupek, Jr. | |
| 6,134,581 A | 10/2000 | Ismael | |
| 6,138,122 A | 10/2000 | Smith | |
| 6,148,335 A | 11/2000 | Haggard | |
| 6,166,732 A | 12/2000 | Mitchell | |
| 6,167,448 A | 12/2000 | Hemphill | |
| 6,175,866 B1 | 1/2001 | Holloway | |
| 6,175,878 B1 | 1/2001 | Seaman | |
| 6,260,050 B1 | 7/2001 | Yost | |
| 6,263,457 B1 | 7/2001 | Anderson | |
| 6,272,150 B1 | 8/2001 | Hrastar | |
| 6,336,138 B1 | 1/2002 | Caswell | |
| 6,363,421 B2 | 3/2002 | Barker | |
| 6,393,386 B1 | 5/2002 | Zager | |
| 6,397,245 B1 | 5/2002 | Johnson, II | |
| 6,434,626 B1 | 8/2002 | Prakash | |
| 6,438,592 B1 | 8/2002 | Killian | |
| 6,456,306 B1 | 9/2002 | Chin | |
| 6,466,932 B1 | 10/2002 | Dennis | |
| 6,487,590 B1 | 11/2002 | Foley | |
| 6,505,248 B1 | 1/2003 | Casper | |
| 6,526,442 B1 | 2/2003 | Stupek, Jr. | |
| 6,621,823 B1 | 9/2003 | Mellquist | |
| 6,707,795 B1 | 3/2004 | Noorhosseini | |
| 6,742,015 B1 | 5/2004 | Bowman-Amuah | |
| 6,763,380 B1 | 7/2004 | Mayton | |
| 6,816,898 B1 | 11/2004 | Scarpelli | |
| 6,895,586 B1 | 5/2005 | Brasher | |
| 6,948,175 B1 | 9/2005 | Fong | |
| 6,985,901 B1 | 1/2006 | Sachse | |
| 7,003,564 B2 | 2/2006 | Greuel | |
| 7,028,228 B1 | 4/2006 | Lovy | |
| 7,043,537 B1 | 5/2006 | Pratt | |
| 7,043,661 B2 | 5/2006 | Valadarsky | |
| 7,062,683 B2 | 6/2006 | Warpenburg | |
| 7,096,459 B2 | 8/2006 | Keller | |
| 7,146,574 B2 | 12/2006 | Goldthwaite | |
| 7,197,466 B1 | 3/2007 | Peterson | |
| 7,215,360 B2 | 5/2007 | Gupta | |
| 7,216,304 B1 | 5/2007 | Gourdol | |
| 7,222,147 B1 | 5/2007 | Black | |
| 7,281,170 B2 | 10/2007 | Taylor | |
| 7,412,502 B2 | 8/2008 | Fearn | |
| 7,505,872 B2 | 3/2009 | Keller | |
| 7,593,013 B2 | 9/2009 | Agutter | |
| 7,596,716 B2 | 9/2009 | Frost | |
| 7,617,073 B2 | 11/2009 | Trinon | |
| 7,660,731 B2 | 2/2010 | Chaddha | |
| 7,676,294 B2 | 3/2010 | Baier | |
| 7,676,437 B2 | 3/2010 | Satkunanathan | |
| 7,840,490 B1 | 11/2010 | Sellers | |
| 7,877,783 B1 | 1/2011 | Cline | |
| 7,890,869 B1 | 2/2011 | Mayer | |
| 7,966,398 B2 | 6/2011 | Wiles, Jr. | |
| 8,060,396 B1 | 11/2011 | Bessler | |
| 8,196,210 B2 | 6/2012 | Sterin | |
| 8,321,948 B2 | 11/2012 | Robinson | |
| 8,407,669 B2 | 3/2013 | Yee | |
| 8,554,750 B2 | 10/2013 | Rangarajan | |
| 8,595,647 B2 | 11/2013 | Sabin | |
| 8,620,818 B2 | 12/2013 | Hughes | |
| 8,646,093 B2 | 2/2014 | Myers | |
| 8,674,992 B2 | 3/2014 | Poston | |
| 8,725,647 B2 | 5/2014 | Disciascio | |
| 9,053,460 B2 | 6/2015 | Gilbert | |
| 9,069,737 B1* | 6/2015 | Kimotho | G06F 11/079 |
| 9,971,826 B1* | 5/2018 | Belmar | G06F 16/27 |
| 10,673,963 B1 | 6/2020 | Feiguine | |
| 10,749,943 B1 | 8/2020 | Feiguine | |
| 10,771,344 B2 | 9/2020 | Bitterfeld | |
| 10,824,650 B2 | 11/2020 | Bar Oz | |
| 10,944,654 B2 | 3/2021 | Rimar | |
| 10,999,152 B1 | 5/2021 | Bar Oz | |
| 11,089,115 B2 | 8/2021 | Garty | |
| 11,095,506 B1 | 8/2021 | Erblat | |
| 11,133,933 B1 | 9/2021 | Grund | |
| 11,275,580 B2 | 3/2022 | Tamir | |
| 11,277,475 B1 | 3/2022 | Tal | |
| 11,281,442 B1 | 3/2022 | Tal | |
| 11,294,666 B1* | 4/2022 | Look | G06F 8/71 |
| 11,296,922 B2 | 4/2022 | Leibkowiz | |
| 11,301,503 B2 | 4/2022 | Burli | |
| 11,379,089 B2 | 7/2022 | Goswami | |
| 11,451,573 B2 | 9/2022 | Waplington | |
| 11,470,107 B2 | 10/2022 | Waplington | |
| 2002/0116340 A1 | 8/2002 | Hellberg | |
| 2002/0133584 A1 | 9/2002 | Greuel | |
| 2002/0158969 A1 | 10/2002 | Gupta | |
| 2003/0118087 A1 | 6/2003 | Goldthwaite | |
| 2003/0200293 A1 | 10/2003 | Fearn | |
| 2005/0015217 A1 | 1/2005 | Weidl | |
| 2005/0091356 A1 | 4/2005 | Izzo | |
| 2006/0026453 A1 | 2/2006 | Frost | |
| 2006/0095461 A1 | 5/2006 | Raymond | |
| 2006/0179058 A1 | 8/2006 | Bram | |
| 2006/0288053 A1* | 12/2006 | Holt | G06F 16/273 |
| | | | 707/999.203 |
| 2006/0293942 A1 | 12/2006 | Chaddha | |
| 2007/0033279 A1 | 2/2007 | Battat | |
| 2007/0188494 A1 | 8/2007 | Agutter | |
| 2007/0288389 A1 | 12/2007 | Vaughan | |
| 2008/0133289 A1 | 6/2008 | Armour | |
| 2008/0148253 A1 | 6/2008 | Badwe | |
| 2008/0319779 A1 | 12/2008 | Hughes | |
| 2009/0088875 A1 | 4/2009 | Baier | |
| 2009/0228984 A1 | 9/2009 | Sterin | |
| 2010/0110932 A1 | 5/2010 | Doran | |
| 2013/0283273 A1* | 10/2013 | Miyazaki | G06F 11/3409 |
| | | | 718/1 |
| 2014/0026133 A1 | 1/2014 | Parker | |
| 2014/0122427 A1* | 5/2014 | Dary | G06F 16/20 |
| | | | 707/E17.005 |
| 2017/0063989 A1 | 3/2017 | Langouev | |

(56) References Cited

U.S. PATENT DOCUMENTS

| | | | |
|---|---|---|---|
| 2018/0123940 A1 | 5/2018 | Rimar | |
| 2019/0104398 A1 | 4/2019 | Owen | |
| 2019/0129739 A1* | 5/2019 | Al Reza | G06F 11/3051 |
| 2019/0149515 A1* | 5/2019 | Sharma | H04L 63/1441 726/11 |
| 2019/0165957 A1* | 5/2019 | Abbott | G06F 21/44 |
| 2019/0342162 A1* | 11/2019 | Bendre | H04L 41/12 |
| 2020/0034462 A1* | 1/2020 | Narayanasamy | G06F 16/214 |
| 2020/0050689 A1 | 2/2020 | Tal | |
| 2020/0089843 A1 | 3/2020 | Flores | |
| 2020/0204443 A1 | 6/2020 | Bar Oz | |
| 2020/0249986 A1 | 8/2020 | Bothello | |
| 2021/0097168 A1* | 4/2021 | Patel | G06F 21/554 |
| 2021/0194764 A1 | 6/2021 | Badyan | |
| 2021/0359879 A1 | 11/2021 | Yang | |
| 2022/0029886 A1 | 1/2022 | Hameiri | |

FOREIGN PATENT DOCUMENTS

| | | | |
|---|---|---|---|
| WO | 9934285 W | 7/1999 | |
| WO | 0052559 W | 9/2000 | |
| WO | 0179970 W | 10/2001 | |

OTHER PUBLICATIONS

Ngu, "A Study of the Effectiveness of Cloud Infrastructure Configuration", In: a thesis presented to the faculty of California State Polytechnic University, Pomona, Masters thesis, Jun. 26, 2020 [retrieved on Oct. 7, 2021]. Retrieved from https:scholarworks.calstate.edu/concern/theses/vl150q40m>, pp. 21-22, 25-26.

Notice of Allowance dated Mar. 23, 2022 for U.S. Appl. No. 17/090,433, 8 pages.

* cited by examiner

SYNCHRONIZATION OF A SHARED SERVICE CONFIGURATION ACROSS COMPUTATIONAL INSTANCES

CROSS-REFERENCE TO RELATED APPLICATION

This application is a continuation of and claims priority to U.S. patent application Ser. No. 16/930,931, filed Jul. 16, 2020, which is hereby incorporated by reference in its entirety.

BACKGROUND

A remote network management platform may include numerous computational instances. Each may be dedicated to a particular managed network and may use certain computational resources of the remote network management platform. The remote network management platform may also include central computational instances that provide shared (or centralized) services to other computational instances (e.g., the computational instances that are dedicated to managed networks).

Some managed networks may employ several computational instances simultaneously, typically one production instance and one or more non-production instances. Production instances may be "live" in the sense that they serve the managed networks and/or customers thereof. Non-production instances may be used by the managed networks, among other things, to develop and test new configurations that are used with the shared services, or to modify such configurations. The non-production instances allow the managed network to conduct testing and experimentation in a safe environment that will not disrupt a production instance or risk its data.

Nonetheless, sometimes when a configuration of a shared service is developed or modified on a non-production instance and then copied to a production instance, its state after copying is invalid. If this discrepancy is not corrected, the shared service may fail to operate properly or at all when invoked by the production instance.

SUMMARY

As the uses of remote network management platforms have grown, it has been discovered that different managed networks would like to deploy similar functionality by way of their respective computational instances. Further, this functionality may be demanding in terms of computational resources, such as processing power and memory.

For example, training a machine learning model may require a significant amount of processing power for a long period of time (e.g., hours or days), and a trained machine learning model may require a significant amount of volatile memory to execute (e.g., several hundreds of megabytes or a few gigabytes). Thus, deploying such functionality to computational instances of the managed networks may cause these computational instances to become overwhelmed and operate more slowly when executing these and other applications. This is especially problematic when a computational instance is also executing applications for which users are expecting interactions with reasonably low latencies, such web-based applications.

Thus, rather than requiring that the managed networks each individually host this computationally expensive functionality in their own computational instances, the functionality may be deployed as a shared service that resides on a central computational instance of the remote network management platform. Individual non-central instances (e.g., computational instances dedicated to managed networks) may access the shared service through various application programming interfaces. Such an arrangement can dramatic reduce the processing and memory requirements of these non-central instances.

Despite these advantages, centralizing common functionality in this fashion can lead to other challenges. Managed networks may use non-production instances for customization and the testing of applications, data models, and configurations. In the case of an application that is configured to communicate with a shared service of a central instance, its configuration may be provided by the non-production instance to the central instance. The configuration may take the form of one or more files, database schema, database entries within this schema, scripts or other program code, for example. The central instance may then apply this configuration to requests that it receives from the non-production instance. When these customizations are considered sufficiently stable and able to provide the desired functionality, the associated configuration may be copied to a production instance of the managed network. But the central instance would not know that the configuration should also be applied to requests that it receives from the production instance. This can cause the shared service to fail, or at least provide results that are not based on the desired or most recent configuration.

Moreover, in some cases, a separate non-production central instance may be used for testing so that the performance and security of the shared service on a production central instance are not impacted. In doing this testing, the managed network's non-production instance may provide the non-production central instance with the configuration. When this configuration is considered sufficiently stable and able to provide the desired functionality, it may be copied to a production instance of the managed network. But the associated production central instance would not have a copy of the configuration. Thus, the production instance may attempt to use the shared service without the configuration being synchronized to the production central instance. This also can cause the shared service to fail, or at least provide results that are not based on the desired or most recent configuration.

As multiple computational instances used by managed networks may have their shared service configurations modified on a frequent basis, it is common for at least some of these configurations to be unsynchronized with a corresponding central instance at any given time. As discussed, this lack of synchronization can lead to one or more managed networks being unable to access shared services in the expected fashion, having a deleterious impact on the usability of the shared services.

The embodiments herein provide techniques for properly synchronizing configurations between computational instances. In particular, when a configuration is copied between computational instances dedicated to a managed network, it can be quickly determined whether the configuration needs to be synchronized with a corresponding central instance.

Accordingly, a first example embodiment may involve transmitting, by a non-production computational instance and to a central computational system, a configuration for a service provided by the central computational system, wherein the non-production computational instance is arranged to test the configuration, and appending, to the configuration at the non-production computational instance, a synchronization identifier to indicate that the configuration has been synchronized with the central computational system. The first example embodiment may also involve receiving, by a production computational instance and from the non-production computational instance, a copy of the configuration; and reading, by the production computational instance, the synchronization identifier from the copy of the configuration. The first example embodiment may further involve determining that the synchronization identifier is not reflected as part of a synchronization history maintained at the production computational instance; and in response to determining that the synchronization identifier is not reflected in the synchronization history, transmitting, by the production computational instance, the copy of the configuration to the central computational system.

A second example embodiment may involve a non-transitory computer-readable medium, having stored thereon program instructions that, upon execution by a computing system, cause the computing system to perform operations in accordance with the first example embodiment.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
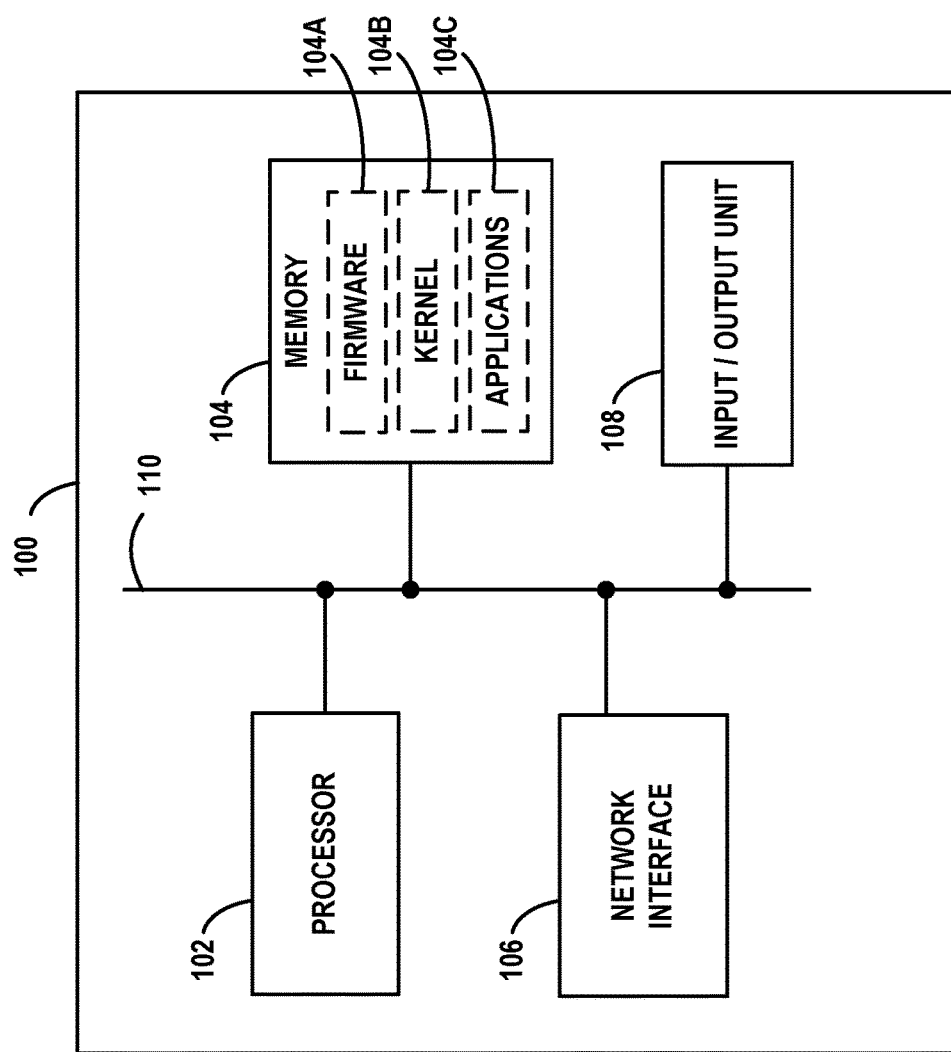
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML, and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
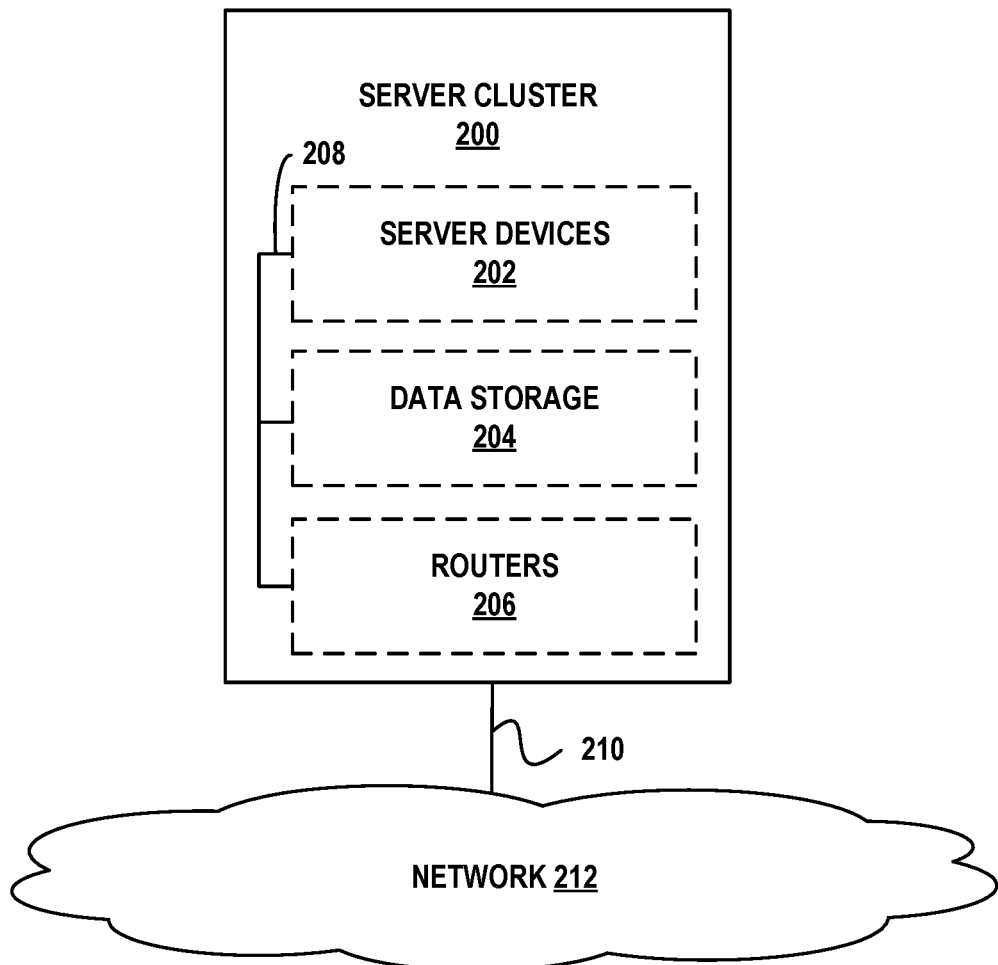
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
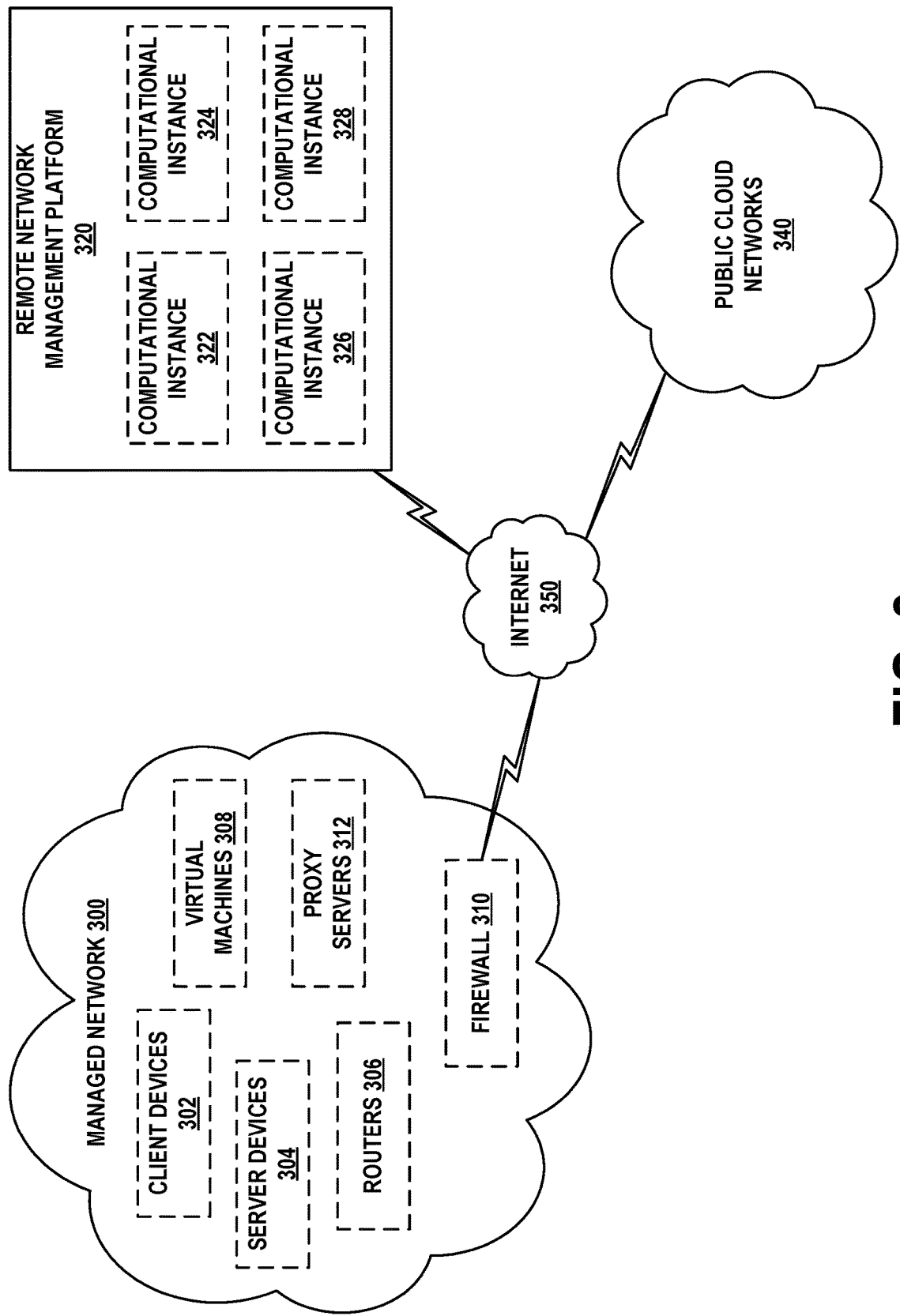
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300.

By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
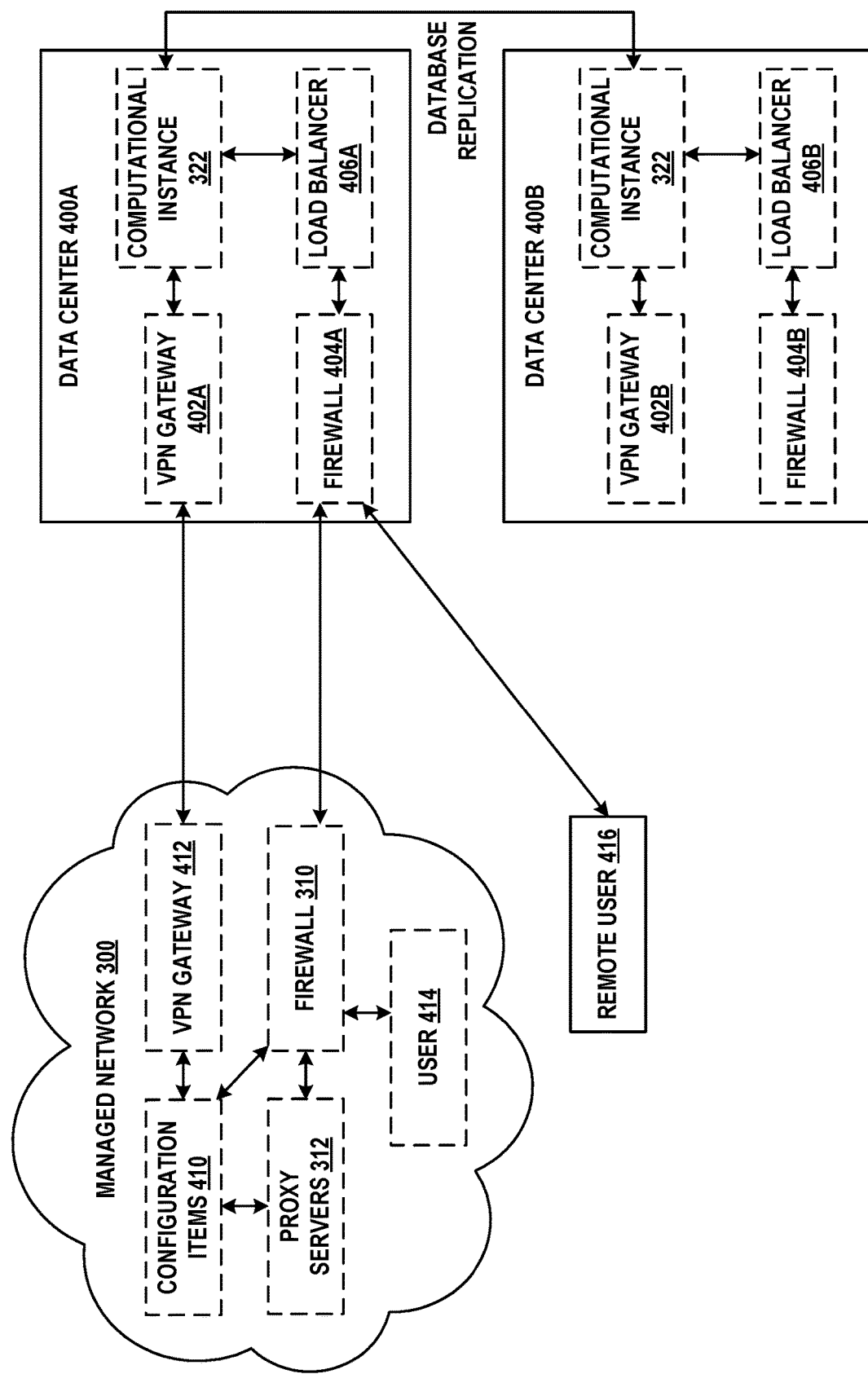
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
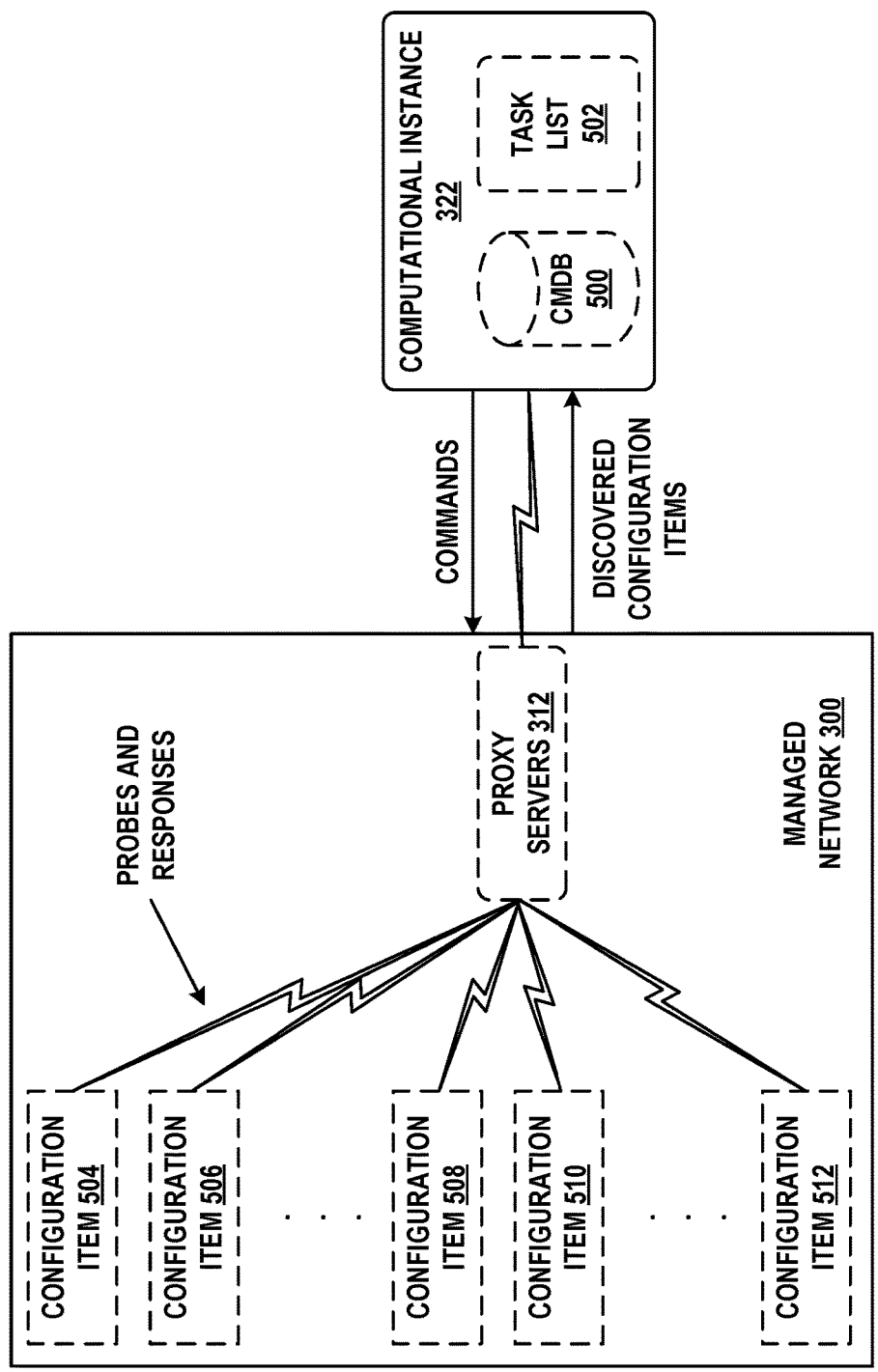
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system.

Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
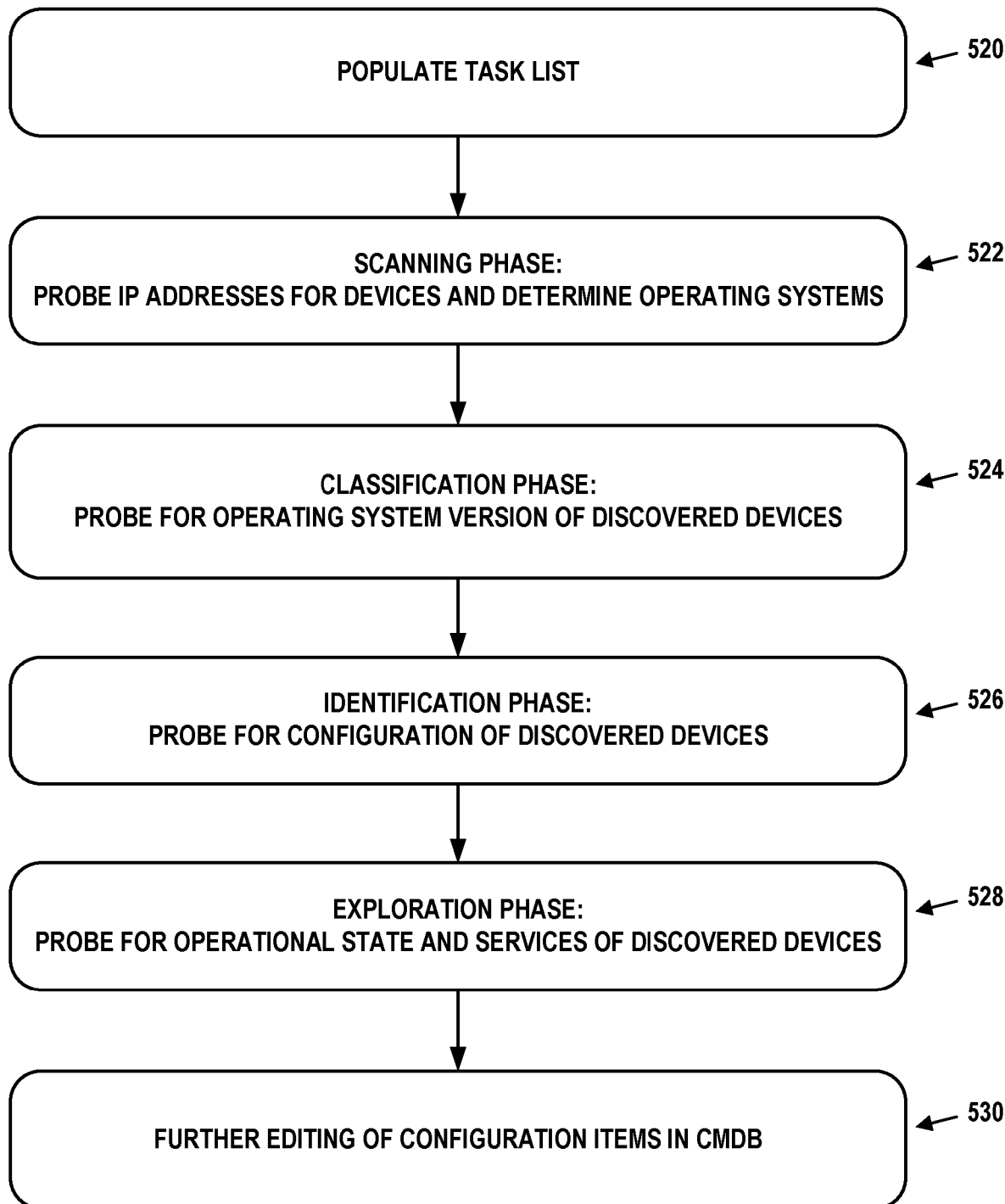
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Support for Centralized Shared Services

Applications may be developed and/or customized on a remote network management platform. A managed network (e.g., an enterprise) may carry out such development and customization within its computational instance(s) to make new uses of the platform or to bring its existing capabilities in line with the needs of the managed network. The applications may be related to IT service management, IT operations management, security operations, customer service management, software asset management, human resources, and/or analytics and reporting. But these are just some examples of applications, and others may be present as well.

These applications tend to be more or less self-contained on a given computational instance of the platform. Thus, such an application may have its own data model, data, configuration, and program code stored in a database of the instance. With this information, the application may be able to (among other capabilities) generate dynamic web-based graphical user interfaces with which users can interact with the application. Thus, from the user's perspective, the utilizing the application may entail navigating a set of such user interfaces, and adding, removing, and/or changing data as desired therewith.

A computational instance may also allow a developer to customize the application by adjusting its data model, configuration, and/or program code. This can involve adding structure to or removing structure from its database table, changing the layout or content of its graphical user interface, editing executable scripts, and so on. Often, a managed network uses non-production computational instances for this customization as well as the testing thereof. When changes to the application are considered sufficiently stable and able to provide the desired functionality, the application may be copied to a production computational instance for general use.

As noted previously, there are numerous advantages to deploying computationally-intensive applications as shared services in central computational instances. For example, reducing processor load and memory utilization of computational instances dedicated to managed networks can make these customer-facing computational instances more stable and responsive. The shared services may be accessed by way of one or more application programming interfaces (APIs).

Unlike applications operating on computational instances dedicated to a managed network, centralized shared services are generally developed, tested, and modified by an entity that operates the remote network management platform, rather than individual managed networks.

Instead, managed networks may customize the behavior of shared services through configurations supplied to the central computational instances.

But the managed networks may still have to test these configurations and how their applications integrate with shared services as configured. Thus, the paradigm of a managed network using non-production computational instances for testing and production computational instances for live deployments holds.

To that point, in some cases non-production central computational instances may be disposed within a remote network management platform for purposes of testing. These instances may be arranged to mimic the behavior of production central computational instances. Thus, they may provide the same shared services (or versions thereof) that are deployed within production central computational instances. A managed network is expected to test a configuration by using that configuration in a non-production computational instance and with a non-production central computational instance until it is satisfied that the configuration meets its goals. Then the configuration may be promoted to the managed network's production computational instance.

A. Architecture

Figure 6A:
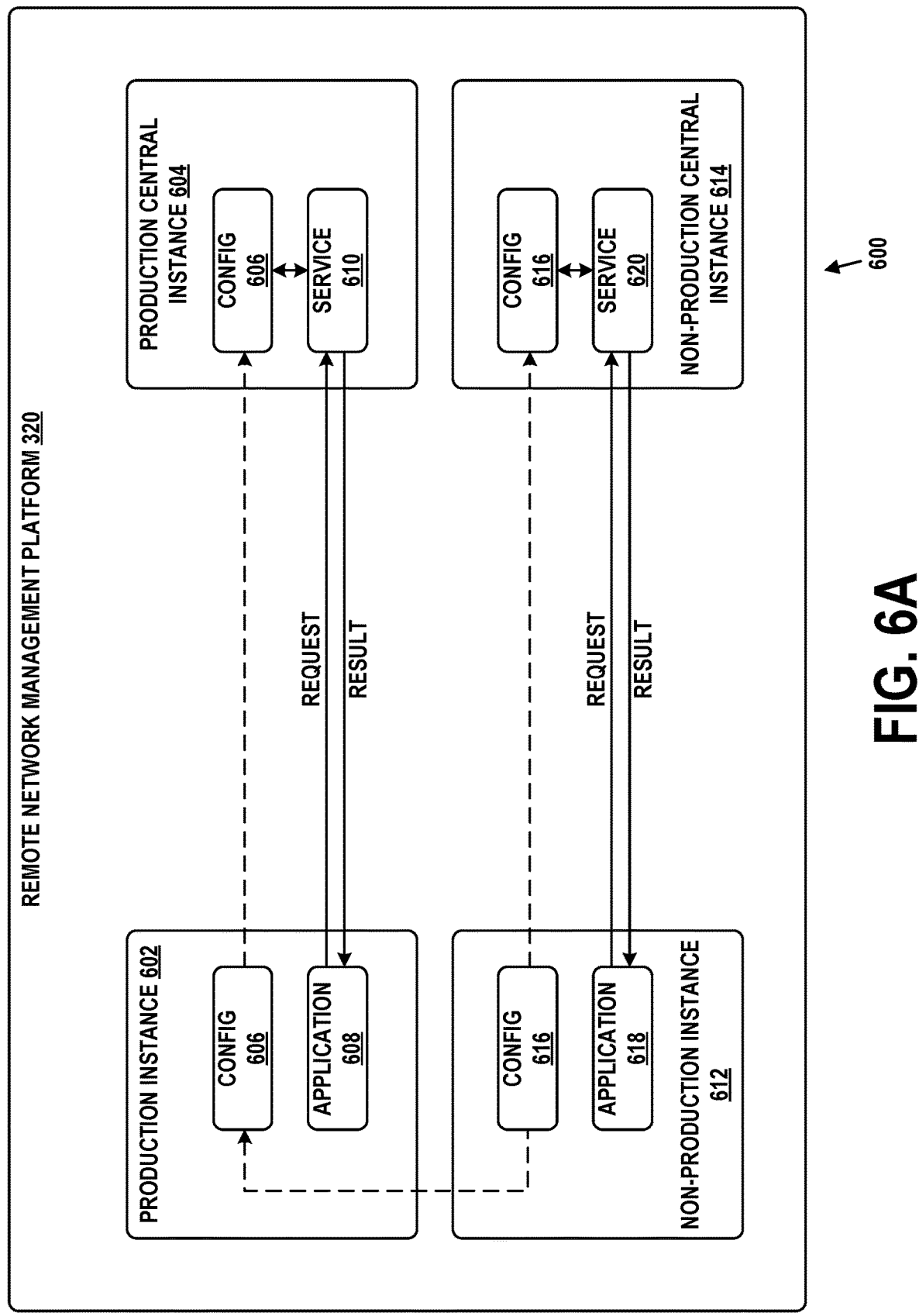
FIG. 6A depicts an arrangement of computational instances within a remote network management architecture, in accordance with example embodiments.

FIG. 6A illustrates an example of such an arrangement. In FIG. 6A and throughout this specification, the language used to describe computational instances may be simplified for purposes of readability. Thus, a "production instance" may refer to a production computational instance that is dedicated a managed network, while a "non-production instance" may refer to a non-production computational instance that is dedicated a managed network. Likewise, a "production central instance" may refer to a production central computational instance that is configured to provide one or more shared services to the production instances of one or more managed networks, while a "non-production central instance" may refer to a non-production central computational instance that is configured to provide one or more shared services to the non-production instances of one or more managed networks. A "non-central" instance may refer to any computational instance dedicated to a managed network, whether production or non-production.

Arrangement 600 of FIG. 6A includes production instance 602, production central instance 604, non-production instance 612, and non-production central instance 614. Production instance 602 and non-production instance 612 are dedicated to a managed network and can be used and configured by the managed network. Production central instance 604 and non-production central instance 614 are controlled by the entity that operates remote network management platform 320, and provide respective shared services. Notably, production central instance 604 provides service 610 and non-production central instance 614 provides service 620. Services 610 and 620 may be the same shared service or versions of the same shared service.

In some embodiments, production central instance 604 and non-production central instance 614 may be the same computational instance, and thus may be referred to generally as a production central instance. This scenario is described in more detail below in the context of FIG. 6B.

Production central instance 604 provides service 610 for use by application 608 of production instance 602, and non-production central instance 614 provides service 620 for use by application 618 of non-production instance 612. Applications 608 and 618 may be the same application or versions of the same application. Application 608 may interact with service 610 by sending a request to service 610 and receiving a corresponding result from service 610. Likewise, application 618 may interact with service 620 by sending a request to service 620 and receiving a corresponding result from service 620. Thus, application 608 and service 610 may operate in a client/server mode, while application 618 and service 620 may also operate in a client/server mode.

Further, production instance 602 may contain configuration 606 that can be used to customize the behavior of service 610, and non-production instance 612 may contain configuration 616 that can be used to customize the behavior of service 620. Thus, configurations 606 and 616 may contain representations of parameters (e.g., text, integers, floating point numbers, Boolean values, and/or binary values) and may take many forms (e.g., one or more files, database schema, database entries within this schema, scripts or other program code).

Configuration 606 may be provided to production central instance 604, as shown by the dotted line between these items. Thus, production central instance 604 may store a copy of configuration 606 with an indication that it is associated with production instance 602. Further, service 610 may apply the parameters of configuration 606 when processing requests from production instance 602 (e.g., from application 608 or other applications executing on production instance 602).

Likewise, configuration 616 may be provided to non-production central instance 614, as shown by the dotted line between these items. Thus, non-production central instance 614 may store a copy of configuration 616 with an indication that it is associated with non-production instance 612. Further, service 620 may apply the parameters of configuration 616 when processing requests from non-production instance 612 (e.g., from application 618 or other applications executing on non-production instance 612).

The act of providing a configuration from a non-central instance to a central instance may be referred to as synchronization or publishing of the configuration. Thus, configurations that have not been provided to a central instance may be considered to be "unsynchronized", "unpublished", or otherwise in draft form. Configurations that have been provided to a central instance may be considered to be "synchronized" or "published".

In general, service 610 may be just one of multiple shared services provided by production central instance 604. Each of these shared services may be able to use configurations respectively provided by multiple production instances. For example, if there are m shared services on production central instance 604 and each serves up to n production instances (e.g., where the production instances are respectively dedicated to n different managed networks), there may be up to a total of m×n configurations for these shared services. This also means that a production instance, such as production instance 602, may contain up to m different configurations, one for each shared service on production central instance 604.

Likewise, service 620 may be just one of multiple shared services provided by non-production central instance 614. Each of these shared services may be able to use configurations respectively provided by multiple non-production instances. For example, if there are u shared services on non-production central instance 604 and each serves up to v non-production instances (e.g., where the non-production instances are respectively dedicated to v different managed networks), there may be up to a total of u×v configurations for these shared services. This also means that a non-production instance, such as non-production instance 612, may contain up to u different configurations, one for each shared service on non-production central instance 614.

As noted above, a managed network may provide configuration 616 from non-production instance 612 to non-production central instance 614. This is shown in FIG. 6A with a dotted line indicating the synchronization of configuration 616. This may cause non-production central instance 614 to associate configuration 616 with non-production instance 612 so that requests arriving to service 620 from non-production instance 612 will have configuration 616 applied thereto. The managed network may test configuration 616 (e.g., with application 618 and/or other applications) on non-production instance 612 and use service 620 as configured thereby until configuration 616 is deemed satisfactory.

Then, configuration 616 may be copied to production instance 602. In FIG. 6A, this copy is labeled configuration 606, and the copying is shown by the dotted line between these items. While configuration 606 is a copy of configuration 616, these two configurations are separate and independent. Thus, they are given two different labels to indicate that either may be further modified in an independent fashion after the copying occurs.

The managed network may then provide configuration 606 from production instance 602 to production central instance 604. This is shown in FIG. 6A with a dotted line indicating the synchronization of configuration 606. This may cause production central instance 604 to associate configuration 606 with production instance 602 so that requests arriving to service 610 from production instance 602 will have configuration 606 applied thereto.

This process of testing configurations on non-production instances (and with shared services of non-production central instances) and then promoting tested configurations to production instances (to use with corresponding shared services of production central instances) may be ongoing. Thus, these configurations may change from time to time, perhaps as often as several times per day.

As noted above, production central instance 604 and non-production central instance 614 may be the same computational instance. Thus, service 610 and service 620 may be the same service. In these cases, only one central instance may be used by both production instance 602 and non-production instance 612, but the configurations for services of this central instance may still be associated with the non-central instances from which they were received. Thus, configuration 606 may be associated with production instance 602 and configuration 616 may be associated with non-production instance 612.

Figure 6B:
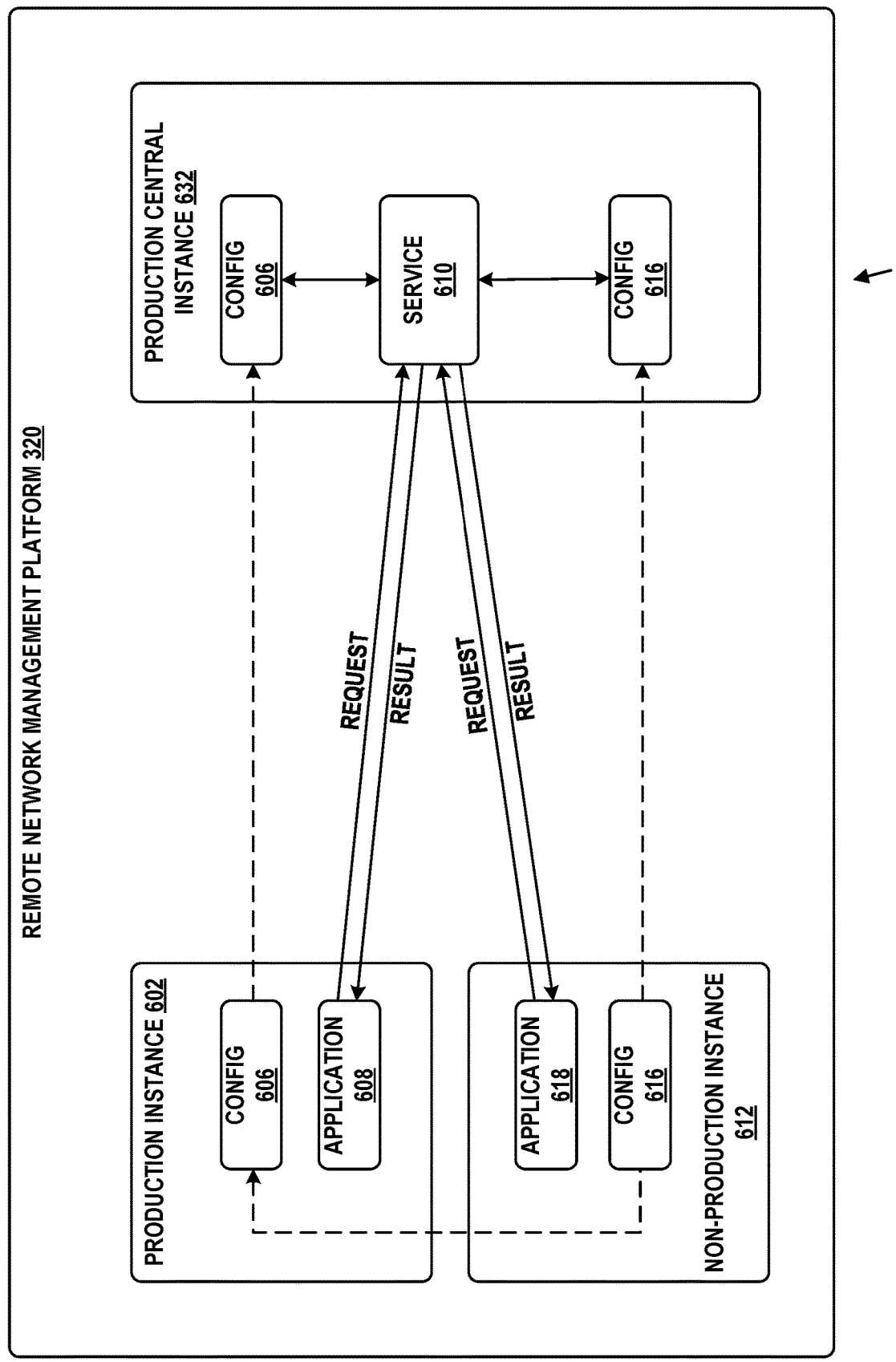
FIG. 6B depicts another arrangement of computational instances within a remote network management architecture, in accordance with example embodiments.

This scenario with a single central instance is shown in FIG. 6B. Arrangement 630 includes production central instance 632 hosting service 610 and storing configuration 606 for use with requests from production instance 602. Production central instance 632 also stores configuration 616 for use with requests from non-production instance 612. All other architecture and operational aspects of arrangement 630 may be consistent with those of arrangement 600.

B. Example Shared Services and Configurations

Services 610 and 620 may be any functionality that can be logically separated into the server portion of a client/server architecture. As noted, this may involve the server portion being deployed as a shared service on a central instance and the client portion being deployed on one or more non-central instances dedicated to managed networks.

For purposes of illustration, it is assumed below that services 610 and 620 are search services. But other shared services are possible, such as machine learning model training services, machine learning model execution services, software coordination and deployment services, and security vulnerability assessment services, just to name a few.

Traditionally, search functionality was provided entirely within a computational instance. A user would enter a search query into a web-based user interface, for example, and the computational instance would perform a search algorithm over a corpus of documents stored within the computational instance. These might be incident reports opened by IT users to describe problems that they have experienced, online chat records that represent message-based conversations between one or more participants, and/or knowledgebase articles that are longer, pre-written guides or sets of instructions for addressing certain types of problems. The search algorithm might look for documents containing terms of the search query, and return a list of these documents.

More advanced search techniques may involve word embeddings. Word embedding refers to a set of language modeling and feature learning techniques where terms, words, or phrases from a vocabulary are mapped to vectors of integer or real numbers in a p-dimensional semantic space. This allows algebraic expressions (e.g., a Euclidian distance, a cosine similarity, etc.) to be applied to words and groups of words to determine the semantic similarities thereof. These similarities may be used with incident reports, online chat requests, knowledgebase articles, other sources, and parts thereof to make recommendations.

Selecting a relevant set of documents based on a search query could be performed in a variety of ways. In some embodiments, a similarity value could be determined between the search query and the textual summaries of each of the records, and the relevant set selected based on the determined similarity value. This could include selecting the top s most similar records to the search query. In order to improve the search results, the similarity value could be determined based on tokenized versions of the search query and the textual summaries. For example, based on tokenized versions of the search query and/or textual summaries that have had common words (e.g., words from a pre-determined corpus of English words), stop-words (e.g., words manually selected due to describing generic and/or ambiguous technical topics), punctuation, and/or other content removed. The textual summaries in each record could be tokenized before receiving a search query and/or the records could be received already containing tokenized versions of the textual summaries.

A degree of overlap between the identities of words present in the two samples of text and/or a word matrix method could be used to determine the degree of similarity. Additionally or alternatively, one or more techniques of natural language processing could be applied to compare the samples of text such that the context or other semantic content of the texts affects the determined similarity value between the samples of text.

Such techniques may be applied to improve text query matching related to documents. These techniques may include a variety of machine algorithms that can be trained based on samples of text. The samples of text used for training can include past examples of incident reports, online chat records, knowledgebase articles, or other text samples of the same nature as the text samples to which the trained model will be applied. This has the benefit of providing a model that has been uniquely adapted to the vocabulary, topics, and idiomatic word use common in its intended application.

Such techniques can include determining the relative frequency of terms (words or tokens) in a corpus and mapping those frequencies into a vector space. Various types of "bag of words" techniques, including term frequency-inverse document frequency (TF-IDF) and related procedures may use such mappings. Additional techniques include determining word and/or paragraph vectors from samples of text, applying artificial neural networks or other deep learning algorithms, performing sentiment analysis, or other techniques in order to determine a similarity between samples of text, to group (cluster) multiple samples of text together according to topic or content, to partition a sample of text into discrete internally-related segments, to determine statistical associations between words, or to perform some other language processing task. TF-IDF, word vectors, and paragraph vectors are used as example approaches for training a model to represent the semantic meanings of words. These techniques may be combined with one another or with other techniques. For example, word vectors can be clustered according to various clustering algorithms to determine their relative similarities.

Regardless of how they are generated, word embeddings may involve natural language processing and/or machine learning techniques. Thus, training a machine learning model to represent word embeddings on a reasonably-sized vocabulary (e.g., 100,000 words) may take an extensive amount of processing power. Further the trained model could be quite large, perhaps hundreds of megabytes or more. Thus, search techniques using word embeddings are natural candidates for deployment on central computational instances rather than computational instances dedicated to a managed network.

For example, a managed network may provide copies of a corpus of documents to a training algorithm on a central computational instance. This training algorithm may create a model that represents the words in these documents as vectors in a p-dimensional semantic space. Search queries are then mapping into this space so that they can be compared to the words in the model. When there is a sufficient degree of similarity (e.g., a small enough distance in the p-dimensional semantic space) between the words of a query and those of a document, the document may be provided as a result of the query.

As noted, a configuration provided by the managed network may be used to customize the behavior of the search service. Parameters within this configuration may include, a language of the documents, the number of search results to return, a list of synonymic terms (e.g., "OOO" is a synonym for "out of office", "mobile" is a synonym for "phone", etc.), a dictionary for spell checking search queries before they are submitted, the size of an artificial neural network that generates the vectors and number of iterations used to train it, and so on.

C. Synchronization of Configurations

As discussed earlier, configurations may be synchronized from a managed network's non-production instance to a central instance and then promoted (copied) from this non-production instance to a production instance of the managed network. But this can cause problems, as such a configuration the production instance would still need to be synchronized with the central instance in order to take effect. This is because a central instance associates configurations with the non-central instance from which they were received.

In the case where there are production and non-production central instances (e.g., production central instance 604 and non-production central instance 614 in arrangement 600), a configuration that is newly copied to a managed network's production instance would not be known to the production central instance until such synchronization occurs. In the case where there is only a production central instance (e.g., production central instance 632 in arrangement 630), a configuration that is newly copied to a managed network's production instance would not be associated with the production instance until such synchronization occurs.

This can lead to problems in practice. Configurations copied from a non-production instance to a production instance would need to be manually synchronized with a central instance in order to take effect. But such configurations may be copied to the production instance along with many other units of data (e.g., files, database schema, database entries within this schema, scripts or other program code), making it difficult to keep track of which of these units need to be synchronized. Observations have been made that configurations often remain unsynchronized after being copied to a production instance, and this can result in shared services not behaving as expected, or failing to operate at all for the production instance.

To remedy these issues, the act of synchronizing a configuration may be memorialized in the configuration itself as well as in a synchronization history. The latter may be stored on the non-central instance that carried out the synchronization as a log file or entries therein.

For example, when a configuration is synchronized from a non-central instance to a central instance, a unique synchronization identifier may be added to the configuration as stored on the non-central instance as well as to a synchronization history stored on the non-central instance. This synchronization identifier may be, for example, a randomly-generated bitstring of sufficient length (e.g., 32 bits, 64 bits, 96, bits, 112 bits, 128 bits, or 256 bits) that it is virtually impossible for two such bitstrings to be generated during the lifetime of a given non-central instance. Case in point, 64 bits can hold 18 quintillion different values, causing the likelihood of the same synchronization identifier value being generated twice by the same non-central instance to be infinitesimally small. Such a bitstring can be stored as a binary, hexadecimal, or string value in both the configuration and the synchronization history.

With the synchronization identifier stored in these two places, a computational instance can determine whether any of its configurations need to be synchronized with a central instance. Particularly, consider a scenario in which a configuration has been copied from a managed network's non-production instance to a production instance. The configuration may have been synchronized with a central instance, and therefore may contain a synchronization identifier.

Program code (e.g., in the form of a script for which execution is caused by the copying of the configuration, is triggered manually, or executes from time to time), may parse the configuration for the synchronization identifier. Once the synchronization identifier is found, the program code may also parse the production instance's synchronization history. If the synchronization identifier is found in synchronization history, then the configuration has been synchronized with the central instance and no further synchronization actions need to be taken with respect to the configuration. If the synchronization identifier is not found in synchronization history, then the configuration has not been synchronized with the central instance and the production instance should provide the configuration to the central instance and add it to the production instance's synchronization history.

Alternatively, the synchronization identifier may be removed from the configuration so that the configuration and synchronization history are consistent. Then, the configuration may layer be manually or automatically synchronized, with the same or a new synchronization identifier being written to both the configuration and the synchronization history.

Notably, synchronization histories exist on a per-instance basis and are not copied from the non-production instance to the production instance. Thus, even if the configuration is synchronized from a non-production instance to a central instance, the synchronization identifier will only exist in the synchronization history of the non-production instance. Consequently, the synchronization identifier will not exist in the synchronization history of the production instance, causing the production instance to synchronize the configuration as need.

Figure 7A:
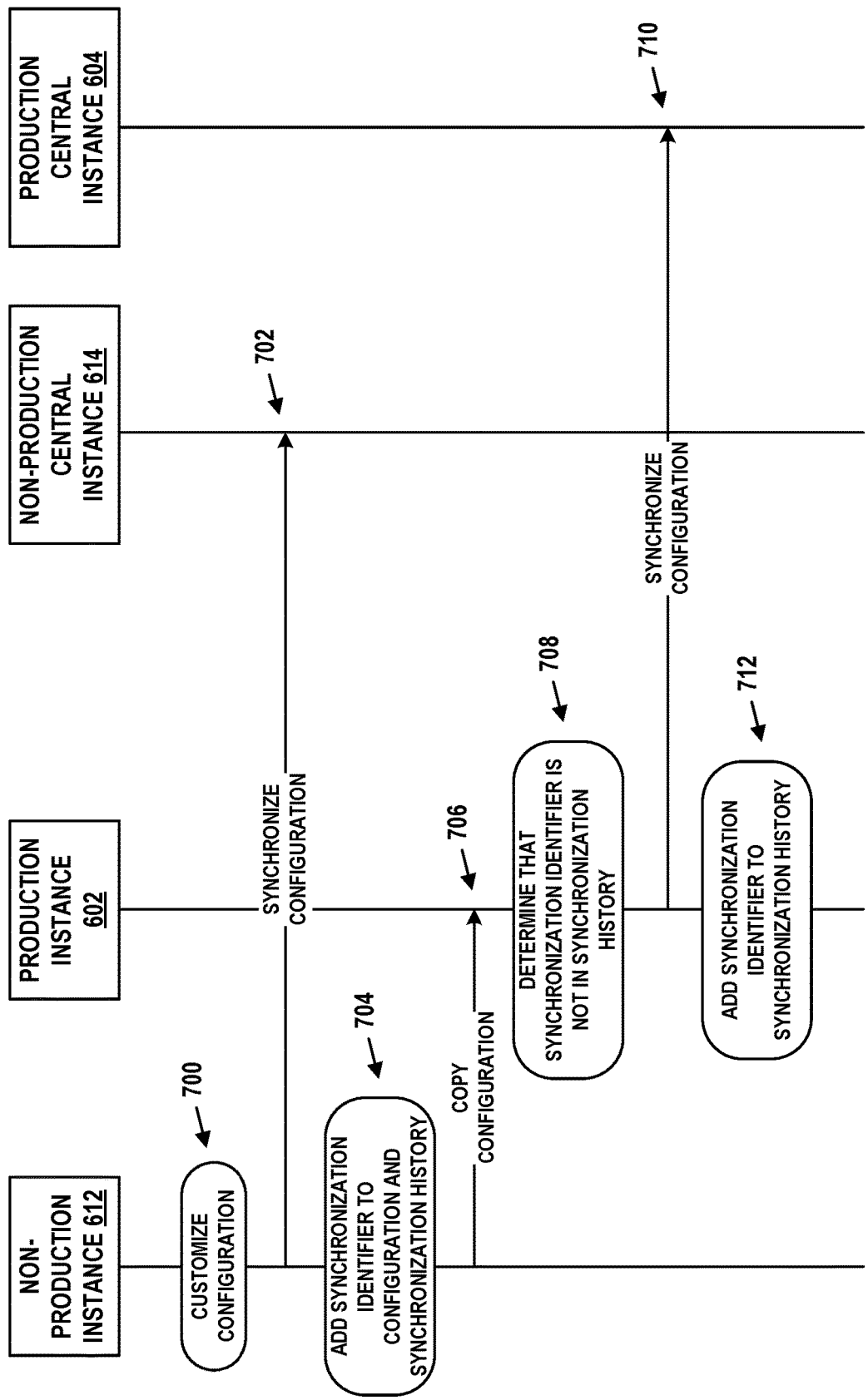
FIG. 7A is a message flow diagram, in accordance with example embodiments.
Figure 7B:
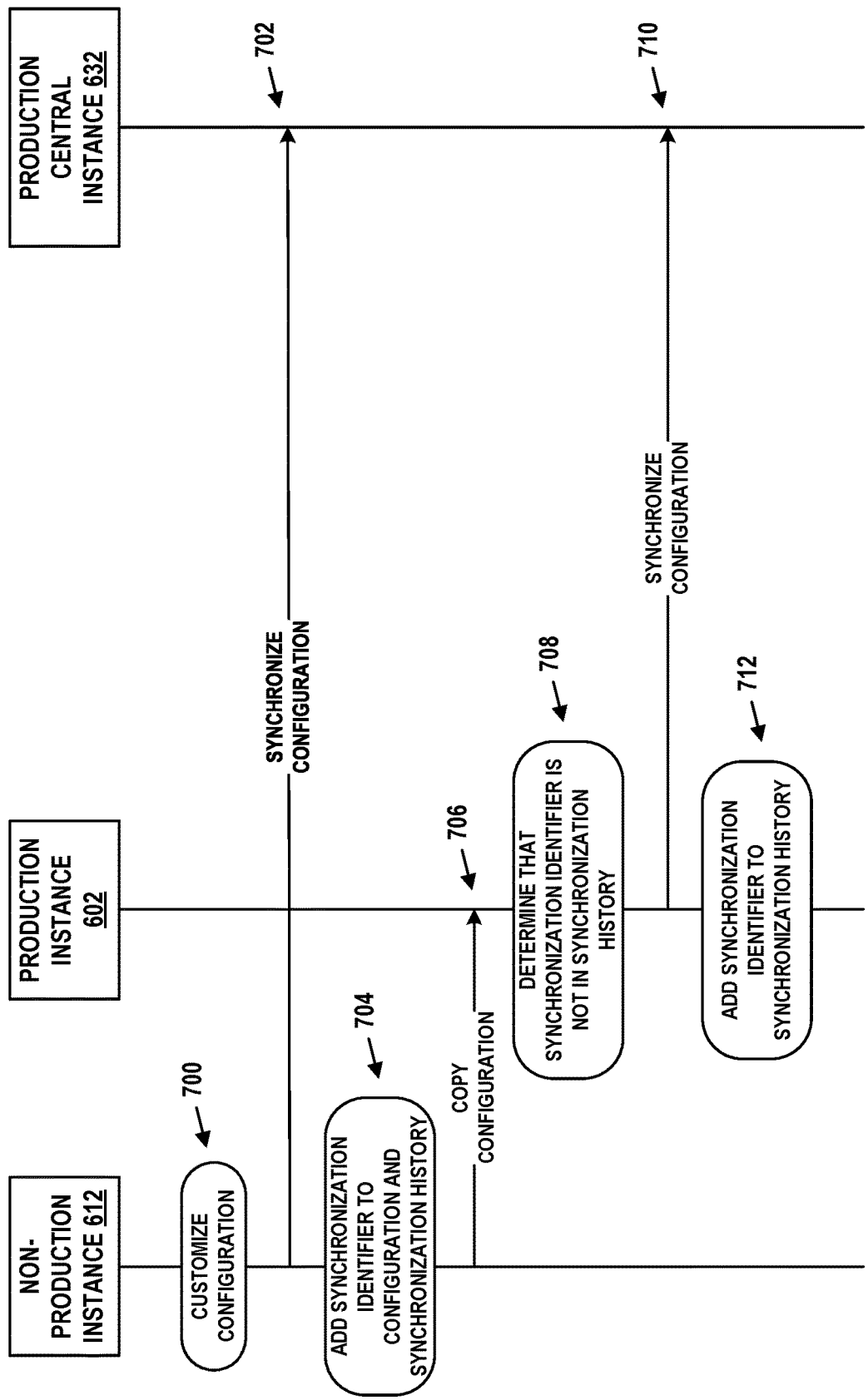
FIG. 7B is another message flow diagram, in accordance with example embodiments.

These synchronization procedures are illustrated in FIGS. 7A and 7B. FIG. 7A involves non-production instance 612, production instance 602, non-production central instance 614, and production central instance 604.

At step 700, a configuration for how non-production instance 612 is to interact with a shared service hosted by non-production central instance 614 is customized. At step 702, non-production instance 612 synchronizes (e.g., copies) the configuration to non-production central instance 614. At step 704, a synchronization identifier (e.g., a 32-bit or longer randomly-generated bitstring) is added to the configuration and to a synchronization history of non-production instance 612.

At step 706, the configuration is copied from non-production instance 612 to production instance 602. At step 708, the configuration is parsed and it is determined that the synchronization identifier in the configuration is not in the synchronization history of production instance 602. Step 708 may be triggered by the completion of step 706, manually, based on a timer, or by way of some other mechanism. At step 710, possibly in response to determining that the synchronization identifier in the configuration is not in the synchronization history of production instance 602, production instance 602 may synchronize the configuration to production central instance 604. At step 712, the synchronization identifier is added to the synchronization history of production instance 602.

FIG. 7B depicts a similar set of transactions as that of FIG. 7A, with the exception that production central instance 632 replaces both non-production central instance 614 and production central instance 604. Thus, both steps 702 and 710 are between non-production instance 612 and production central instance 632.

VI. Example Operations

Figure 8:
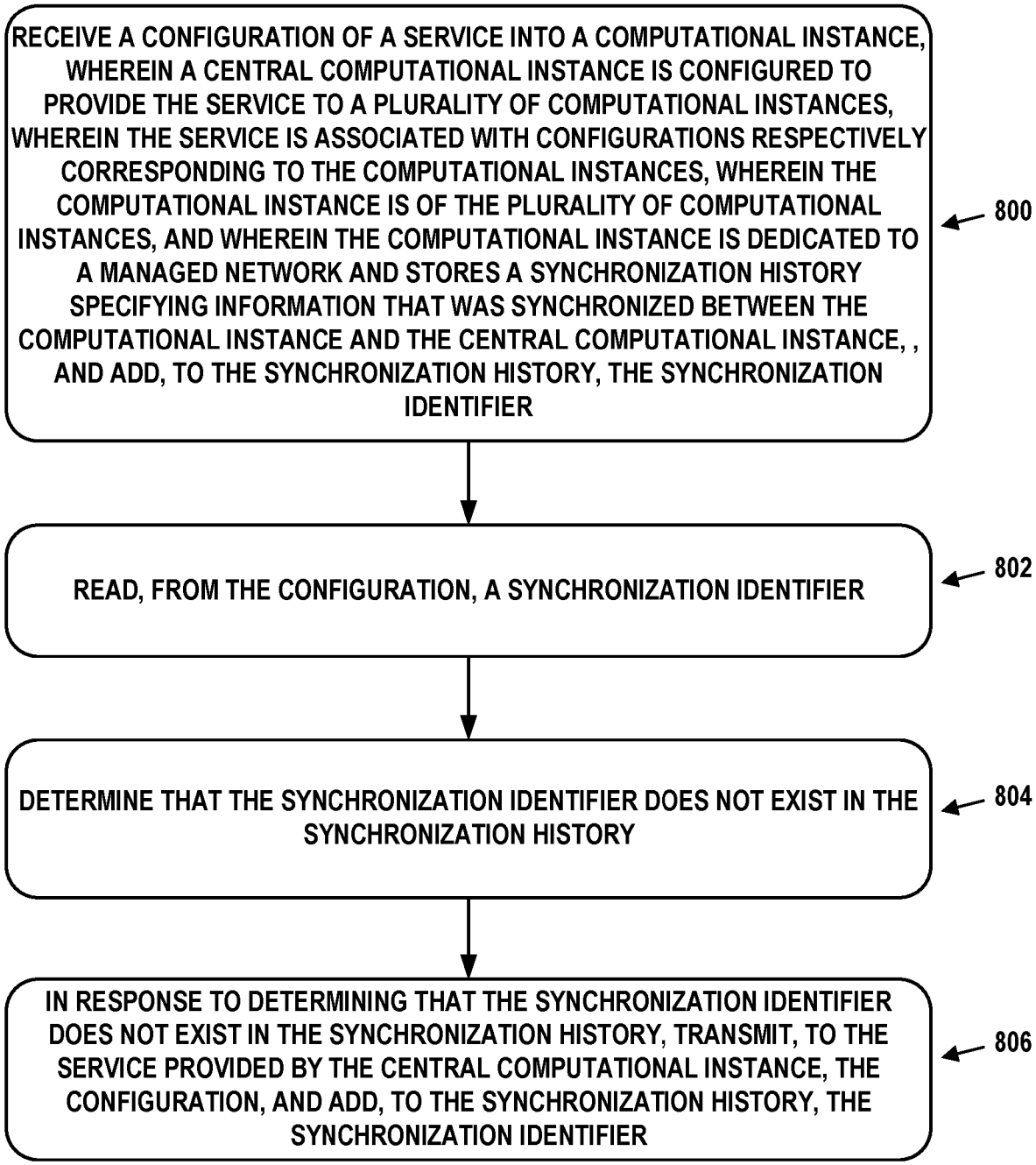
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 8 may be simplified by the removal of any one or more of the features shown therein. Further, these embodiments may be combined with features, aspects, and/or implementations of any of the previous figures or otherwise described herein.

Block 800 may involve receiving a configuration of a service into a computational instance, wherein a central computational instance is configured to provide the service to a plurality of computational instances, wherein the service is associated with configurations respectively corresponding to the computational instances, wherein the computational instance is of the plurality of computational instances, and wherein the computational instance is dedicated to a managed network and stores a synchronization history specifying information that was synchronized between the computational instance and the central computational instance.

Block 802 may involve reading, from the configuration, a synchronization identifier.

Block 804 may involve determining that the synchronization identifier does not exist in the synchronization history.

Block 806 may involve, possibly in response to determining that the synchronization identifier does not exist in the synchronization history, (i) transmitting, to the service provided by the central computational instance, the configuration, and (ii) adding, to the synchronization history, the synchronization identifier.

In some embodiments, the central computational instance and the computational instance utilize separate sets of computational resources.

Some embodiments may involve: receiving, at the central computational instance, the configuration; and creating an association between the configuration and the service, wherein the association indicates that the configuration is for the computational instance.

In some embodiments, receiving the configuration of the service into the computational instance does not cause any changes to the synchronization history.

In some embodiments, a non-production central computational instance is configured to provide a non-production version of the service to a plurality of non-production computational instances, wherein the non-production version of the service is associated with non-production versions of the configurations respectively corresponding to non-production computational instances. These embodiments may further involve: transmitting a non-production version of the configuration to the non-production version of the service provided by the non-production central computational instance; writing, to the non-production version of the configuration, the synchronization identifier; and transmitting, to the computational instance and as the configuration, a copy of the non-production version of the configuration.

Some embodiments may involve: transmitting a non-production version of the configuration to the service provided by the central computational instance; writing, to the non-production version of the configuration, the synchronization identifier; and transmitting, to the computational instance and as the configuration, a copy of the non-production version of the configuration.

In some embodiments, the synchronization identifier is a randomly-generated bitstring of at least 32 bits.

In some embodiments, the service is a machine-learning-based search service, wherein the configuration defines one or more of a dictionary, a list of terms and associated synonyms, or database tables for use by the machine-learning-based search service.

In some embodiments, a second computational instance of the plurality of computational instances is dedicated to a second managed network and stores a second synchronization history defining information that was synchronized between the second computational instance and the central computational instance. These embodiments may involve: receiving a second configuration of the service into the second computational instance, wherein the second configuration was received from a second non-production computational instance of the plurality of computational instances, wherein the second non-production computational instance is also dedicated to the second managed network; reading, from the second configuration, a second synchronization identifier; determining that the second synchronization identifier does not exist in the second synchronization history; and, in response to determining that the second synchronization identifier does not exist in the second synchronization history, transmitting the second configuration to the service provided by the central computational instance.

In some embodiments, a second computational instance of the plurality of computational instances is dedicated to a second managed network and stores a second synchronization history defining information that was synchronized between the second computational instance and the central computational instance. These embodiments may involve: receiving a second configuration of the service into the second computational instance, wherein the second configuration was received from a second non-production computational instance of the plurality of computational instances, wherein the second non-production computational instance is also dedicated to the second managed network; reading, from the second configuration, a second synchronization identifier; determining that the second synchronization identifier does not exist in the second synchronization history; and, in response to determining that the second synchronization identifier does not exist in the second synchronization history, removing the second synchronization identifier from the second configuration.

In some embodiments, the configuration was received from a non-production computational instance of the plurality of computational instances, wherein the non-production computational instance is also dedicated to the managed network.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   transmitting, by a non-production computational instance and to a central computational system, a configuration for a service provided by the central computational system, wherein the non-production computational instance is arranged to test the configuration;
   appending, to the configuration at the non-production computational instance, a synchronization identifier to indicate that the configuration has been synchronized with the central computational system;
   receiving, by a production computational instance and from the non-production computational instance, a copy of the configuration;
   reading, by the production computational instance, the synchronization identifier from the copy of the configuration;
   determining that the synchronization identifier is not reflected as part of a synchronization history maintained at the production computational instance; and
   in response to determining that the synchronization identifier is not reflected in the synchronization history, transmitting, by the production computational instance, the copy of the configuration to the central computational system, and adding, to the synchronization history, a copy of the synchronization identifier.

2. The method of claim 1, wherein the non-production computational instance, the production computational instance, and the central computational system utilize separate sets of computational resources of a system.

3. The method of claim 1 further comprising:
   receiving, at the central computational system, the copy of the configuration from the production computational instance; and
   creating an association between the copy of the configuration and the service, wherein the association indicates that the copy of the configuration is for the production computational instance.

4. The method of claim 1, wherein receiving the copy of the configuration at the production computational instance does not cause any changes to the synchronization history.

5. The method of claim 1, wherein the central computational system supports both non-production and production versions of the service.

6. The method of claim 1, wherein the central computational system includes a non-production central computational instance and a production central computational instance, wherein the non-production central computational instance receives the configuration, and wherein the production central computational instance receives the copy of the configuration.

7. The method of claim 1, wherein the synchronization identifier is a randomly-generated string of at least 32 bits.

8. The method of claim 1, wherein the service is a machine-learning-based search service, and wherein the configuration defines one or more of a dictionary, a list of terms and associated synonyms, or database tables for use by the machine-learning-based search service.

9. The method of claim 1 further comprising:
   transmitting, by a second non-production computational instance and to the central computational system, a second configuration for the service, wherein the second non-production computational instance is arranged to test the second configuration;
   appending, to the second configuration at the second non-production computational instance, a second synchronization identifier to indicate that the second configuration has been synchronized with the central computational system;
   receiving, by a second production computational instance and from the second non-production computational instance, a copy of the second configuration;
   reading, by the second production computational instance, the second synchronization identifier from the copy of the second configuration;
   determining that the second synchronization identifier is not reflected as part of a second synchronization history maintained at the second production computational instance; and
   in response to determining that the second synchronization identifier is not reflected in the second synchronization history, transmitting, by the second production computational instance, the copy of the second configuration to the central computational system.

10. The method of claim 1 further comprising:
    receiving, by a second production computational instance and from the non-production computational instance, a second copy of the configuration;
    reading, by the second production computational instance, the synchronization identifier from the second copy of the configuration;
    determining that the synchronization identifier is not reflected as part of a second synchronization history maintained at the second production computational instance; and in response to determining that the synchronization identifier is not reflected in the second synchronization history, transmitting, by the second production computational instance, the second copy of the configuration to the central computational system.

11. A non-transitory computer-readable medium, having stored thereon program instructions that, upon execution by a computing system, cause the computing system to perform operations comprising:
    transmit, by a non-production computational instance and to a central computational system, a configuration for a service provided by the central computational system, wherein the non-production computational instance is arranged to test the configuration;
    append, to the configuration at the non-production computational instance, a synchronization identifier to indicate that the configuration has been synchronized with the central computational system;
    receive, by a production computational instance and from the non-production computational instance, a copy of the configuration;
    read, by the production computational instance, the synchronization identifier from the copy of the configuration;
    determine that the synchronization identifier is not reflected as part of a synchronization history maintained at the production computational instance; and
    in response to determining that the synchronization identifier is not reflected in the synchronization history, transmit, by the production computational instance, the copy of the configuration to the central computational system, and add, to the synchronization history, a copy of the synchronization identifier.

12. The non-transitory computer readable medium of claim 11 further including instructions executable to:
    receive, at the central computational system, the copy of the configuration from the production computational instance; and
    create an association between the copy of the configuration and the service, wherein the association indicates that the copy of the configuration is for the production computational instance.

13. The non-transitory computer readable medium of claim 11, wherein receiving the copy of the configuration does not cause any changes to the synchronization history.

14. The non-transitory computer readable medium of claim 11, wherein the central computational system supports both non-production and production versions of the service.

15. The non-transitory computer readable medium of claim 11, wherein the central computational system includes a non-production central computational instance and a production central computational instance, wherein the non-production central computational instance receives the configuration, and wherein the production central computational instance receives the copy of the configuration.

16. The non-transitory computer readable medium of claim 11, wherein the synchronization identifier is a randomly-generated string of at least 32 bits.

17. The non-transitory computer readable medium of claim 11, wherein the service is a machine-learning-based search service, and wherein the configuration defines one or more of a dictionary, a list of terms and associated synonyms, or database tables for use by the machine-learning-based search service.

18. The non-transitory computer readable medium of claim 11 further including instructions executable to:
    transmit, by a second non-production computational instance and to the central computational system, a second configuration for the service, wherein the second non-production computational instance is arranged to test the second configuration;
    append, to the second configuration at the second non-production computational instance, a second synchronization identifier to indicate that the second configuration has been synchronized with the central computational system;
    receive, by a second production computational instance and from the second non-production computational instance, a copy of the second configuration;
    read, by the second production computational instance, the second synchronization identifier from the copy of the second configuration;
    determine that the second synchronization identifier is not reflected as part of a second synchronization history maintained at the second production computational instance; and
    in response to determining that the second synchronization identifier is not reflected in the second synchronization history, transmit, by the second production computational instance, the copy of the second configuration to the central computational system.

19. The non-transitory computer readable medium of claim 11 further including instructions executable to:
    receive, by a second production computational instance and from the non-production computational instance, a second copy of the configuration;
    read, by the second production computational instance, the synchronization identifier from the second copy of the configuration;
    determine that the synchronization identifier is not reflected as part of a second synchronization history maintained at the second production computational instance; and
    in response to determining that the synchronization identifier is not reflected in the second synchronization history, transmit, by the second production computational instance, the second copy of the configuration to the central computational system.

20. A plurality of computing devices including a non-production computational instance, a central computational system, and a production computation instance, the plurality of computing devices includes at least one processor configured to:
    transmit, by the non-production computational instance and to the central computational system, a configuration for a service provided by the central computational system, wherein the non-production computational instance is arranged to test the configuration;
    append, to the configuration at the non-production computational instance, a synchronization identifier to indicate that the configuration has been synchronized with the central computational system;
    receive, by the production computational instance and from the non-production computational instance, a copy of the configuration;
    read, by the production computational instance, the synchronization identifier from the copy of the configuration;
    determine that the synchronization identifier is not reflected as part of a synchronization history maintained at the production computational instance; and
    in response to determining that the synchronization identifier is not reflected in the synchronization history, transmit, by the production computational instance, the copy of the configuration to the central computational system, and add, to the synchronization history, a copy of the synchronization identifier.

\* \* \* \* \*